United States Patent
King et al.

(10) Patent No.: US 8,990,555 B2
(45) Date of Patent: Mar. 24, 2015

(54) CENTRALIZED KEY MANAGEMENT

(75) Inventors: William C. King, Lafayette, CA (US); Bjorn Hjelm, Livermore, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 145 days.

(21) Appl. No.: 13/585,071

(22) Filed: Aug. 14, 2012

(65) Prior Publication Data
US 2014/0052981 A1 Feb. 20, 2014

(51) Int. Cl.
| H04L 9/32 | (2006.01) |
| H04L 29/06 | (2006.01) |
| H04W 12/04 | (2009.01) |
| H04W 12/06 | (2009.01) |
| H04L 9/08 | (2006.01) |

(52) U.S. Cl.
CPC .......... *H04L 63/0869* (2013.01); *H04L 9/0866* (2013.01); *H04L 9/3273* (2013.01); *H04W 12/04* (2013.01); *H04W 12/06* (2013.01)
USPC ............. 713/155; 713/169; 380/44; 380/270; 725/28; 455/411

(58) Field of Classification Search
CPC .................................. H04L 9/00; H04L 9/32
USPC .............. 713/155, 169; 380/270, 44; 725/28; 455/411
See application file for complete search history.

(56) References Cited

U.S. PATENT DOCUMENTS

| 6,876,747 B1* | 4/2005 | Faccin et al. .................. 380/247 |
| 8,325,922 B1* | 12/2012 | Sun et al. ...................... 380/270 |
| 2012/0204231 A1* | 8/2012 | Holtmanns et al. ............... 726/3 |

* cited by examiner

*Primary Examiner* — Jeffrey Pwu
*Assistant Examiner* — Samuel Ambaye (57) ABSTRACT

A first network device is configured to receive a first request for a first secret key, generate the first secret key, and send the first secret key to a second network device and a first user device; and is also configured to receive a second request for a second secret key, generate the second secret key, and send the second secret key to a third network device and a second user device. The second network device and the first user device may mutually authenticate each other using the first secret key. The third network device and the second user device may mutually authenticate each other using second secret key.

20 Claims, 9 Drawing Sheets

CENTRALIZED KEY MANAGEMENT

BACKGROUND

The generic bootstrapping architecture (hereinafter referred to as "GBA") authentication procedure allows for the authentication of user devices (e.g., wireless devices) within a Third Generation Partnership Project (3GPP) cellular network environment. The authentication may include the creation of secret keys that are used to authenticate a user device with other network devices within the network environment. There may be multiple secret keys generated within the network environment by different network devices for different user devices associated with multiple organizations, different types of applications, and/or other different types of network services.

DETAILED DESCRIPTION OF PREFERRED EMBODIMENTS

The following detailed description refers to the accompanying drawings. The same reference numbers in different drawings may identify the same or similar elements.

Systems and/or methods described herein may generate and store multiple secret keys that are used to authenticate user devices, within a network, that are associated with multiple applications, services, and/or organizations. For example, a first user device may be requesting content (e.g., a movie). The first user device may be required to be authenticated before the user device may receive the content. A second user device may be attempting to communicate with an organization (e.g., a hospital). The organization may require the second user device to be authenticated before the second user device may communicate with the organization. Once the first user device and the second user device are authenticated, secret keys (different for each user device) may be generated by a network device for both user devices. Each secret key may be used to authenticate each user device with other network devices to allow each user device to receive the desired content, information, and/or service. Both secret keys may be stored in the network device.

While the following description focuses on the 3GPP Long Term Evolution (LTE) standard, it will be appreciated that systems and/or methods, described herein, are equally applicable to other wireless standards, such as a wireless fidelity ("WiFi") standard, worldwide interoperability for microwave access ("WiMAX"), global system for mobile communications ("GSM"), or any other wireless standard.

Figure 1:
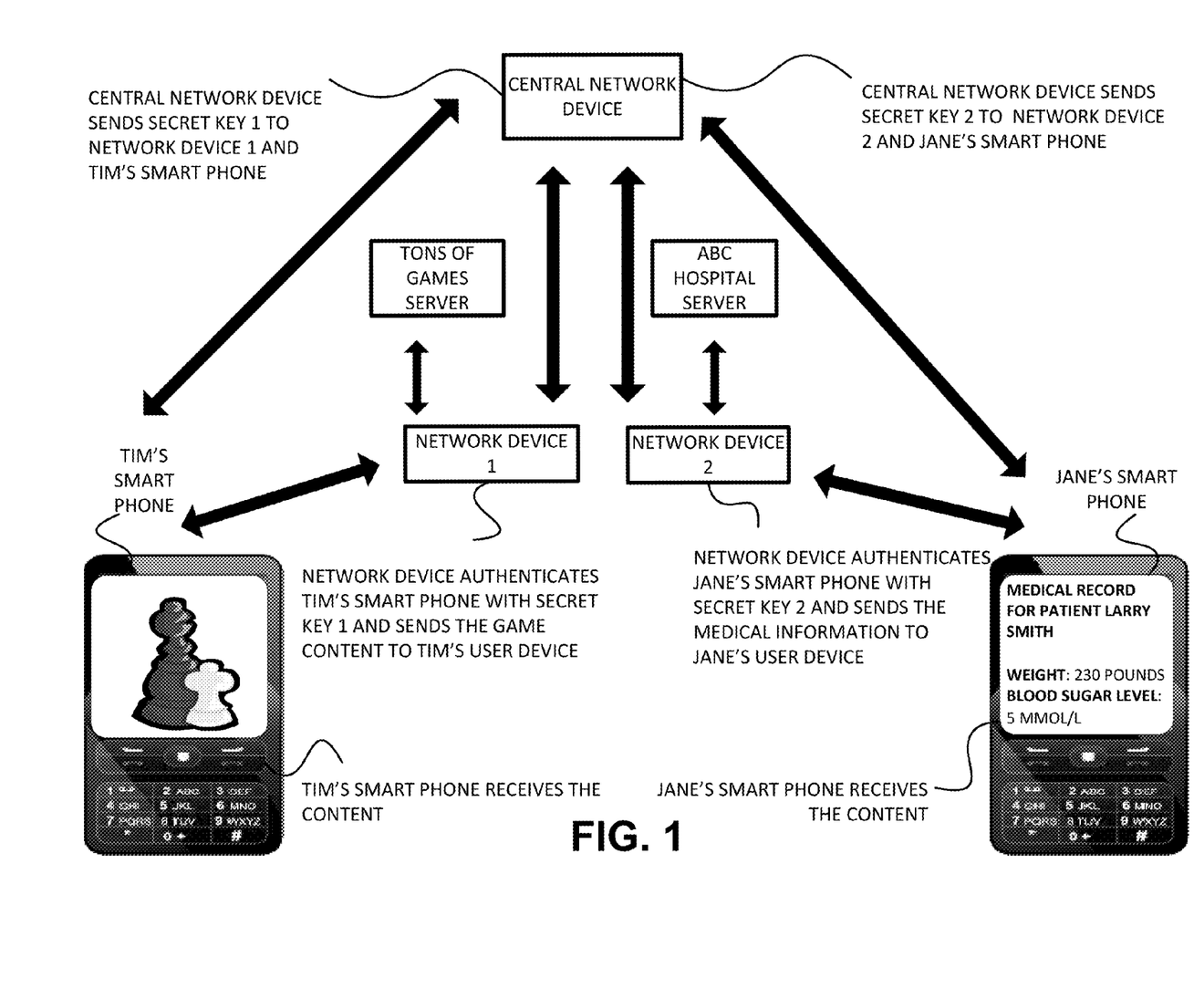
FIG. 1 is a diagram of an overview of an implementation described herein.

FIG. 1 is a diagram of an overview of an implementation described herein. FIG. 1 shows Tim's smart phone, Jane's smart phone, network device 1, network device 2, Tons of Games server, ABC Hospital server, and a central network device.

Assume that Tim would like to use his smart phone to receive a chess game from a provider of game content for user devices known as "Tons of Games." For Tim to receive the chess game, on his smart phone, Tim's smart phone may require authentication before any game content is sent from the Tons of Games server to Tim's smart phone. It is assumed that Tim's smart phone is authenticated by the network. The network may provide service via network device 1, network device 2, and the central network device. Upon authentication, the central network device may create secret key 1 and send secret key 1 to network device 1 and to Tim's smart phone. The network security policies (stored by the central network device) of Tons of Games may require that a secret key can only be used (by a user device) for 24 hours. The central network device may store secret key 1.

Secret key 1 may be used by network device 1 to authenticate Tim's smart phone, so that Tim's smart phone may receive game content from Tons of Games. Tim's smart phone may use secret key 1 to authenticate network device 1. Network device 1 may send the game content to Tim's smart phone. As shown in FIG. 1, Tim's smart phone may receive the game content to allow Tim to play the game on his smart phone.

24 hours after secret key 1 is generated, secret key 1 (based on Tons of Games security policy) may expire. Thus, the central network device may store secret key 1, for 24 hours. After 24 hours, secret key 1 expires and the central network device may remove secret key 1 from storage. Network device 1 may determine that secret key 1 is expired and may send a message to Tim's smart phone that secret key 1 is expired.

Also shown in FIG. 1, assume that Jane (a medical doctor) is using her smart phone to receive medical information about her patient, Larry Smith, from the local hospital, ABC Hospital. For Jane to receive the medical information, on her smart phone, Jane's smart phone may require authentication before any medical information is sent from the ABC Hospital server to Jane's smart phone. It is assumed that Jane's smart phone is authenticated by the network. Upon authentication, the central network device may create secret key 2, and the central network device may send secret key 2 to network device 2 and to Jane's smart phone. The central network device may generate secret keys based on the network security policies of ABC Hospital that are stored by the central network device. The network security policies of ABC Hospital may require that a secret key can only be used (by a user device) in the coverage area (of the network) that ABC Hospital is located. The central network device may store secret key 2.

Secret key 2 may be used by network device 2 to authenticate Jane's smart phone, so that Jane's smart phone may receive medical information from the ABC Hospital server. Secret key 2 may be used by Jane's smart phone to authenticate network device 2. Network device 2 may send the medical information to Jane's smart phone. Jane's smart phone may receive the medical information and Jane may view the medical information her smart phone.

Once Jane's smart phone moves to a different coverage area of the network, the secret key may no longer be valid. Once there is a change in the coverage area, network device 2 may send a message to the central network device that the coverage area has changed. The central network device may receive the message and determine that secret key 2 is no longer valid. The central network device may remove secret key 2 from storage.

As a result, multiple secret keys that are used to authenticate multiple user devices associated with different applications and/or services may be generated and stored by a central network device. This may allow for an efficient allocation of network resources to generate and store multiple secret keys in one central network device instead of using multiple network devices to store different secret keys that are used for different applications and/or services.

Figure 2:
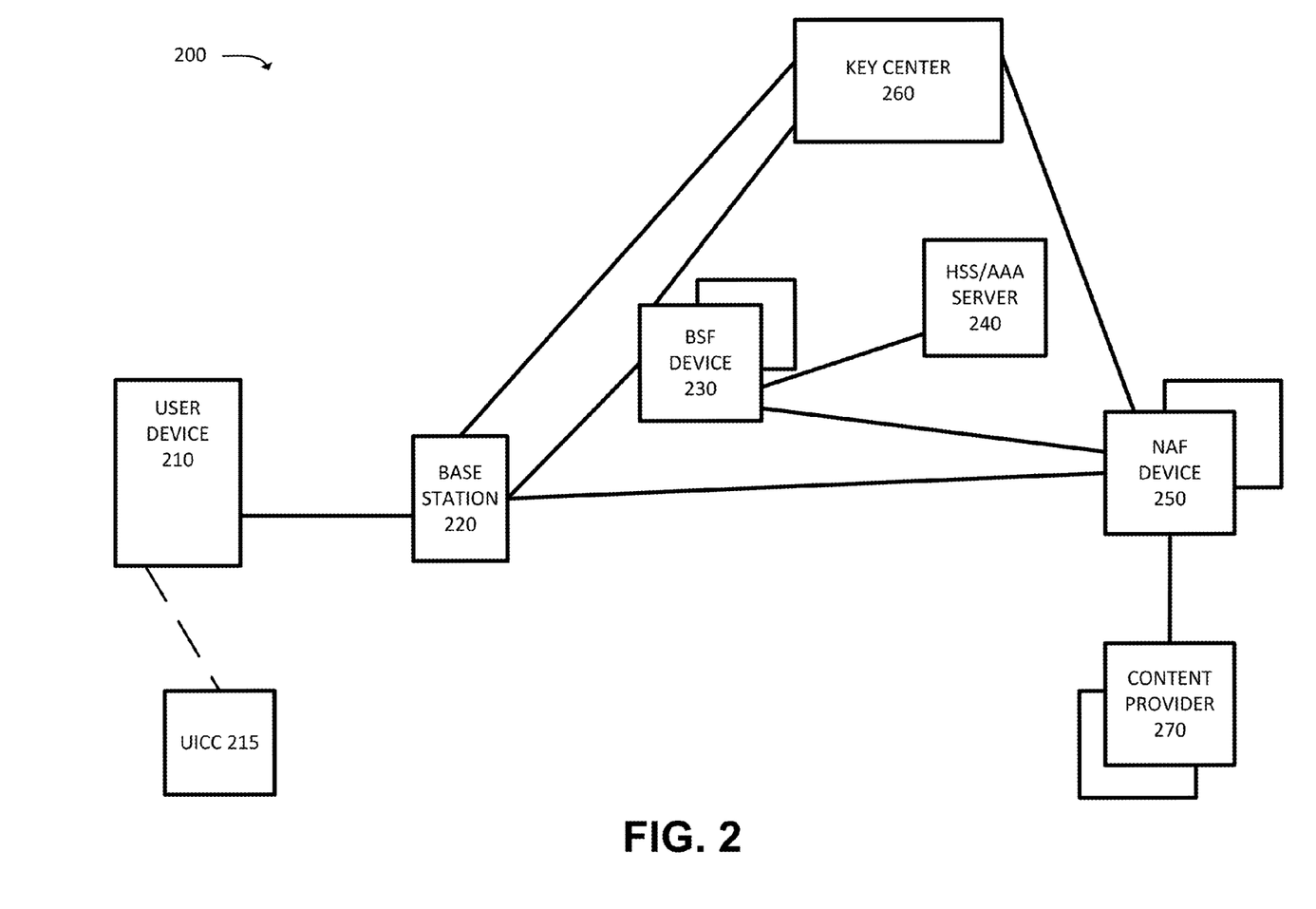
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a universal integrated circuit card 215 (hereinafter referred to as "UICC 215"), a base station 220, a bootstrapping server function device 230 (hereinafter referred to as "BSF device 230"), a home subscriber server (HSS)/authentication, authorization, accounting (AAA) server 240 (hereinafter referred to as "HSS/AAA server 240"), a network application function service device 250 (hereinafter referred to as "NAF device 250"), key center 260, and content provider 270.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200.

Devices of environment 200 may interconnect via wired connections, wireless connections, or a combination of wired and wireless connections by using one or more of the following types of networks: a cellular network, a public land mobile network (PLMN), a second generation (2G) network, a third generation (3G) network, a fourth generation (4G) network, a fifth generation (5G) network, a local area network (LAN), a wide area network (WAN), a metropolitan network (MAN), a LTE network, a telephone network (e.g., the Public Switched Telephone Network (PTSN)), an ad hoc network, a managed IP network, a virtual private network (VPN), an intranet, the Internet, a fiber optic-based network, and/or combination of these or other types of networks.

User device 210 may include any computation or communication device, such as a wireless mobile communication device that is capable of communicating with a network (e.g., LTE network). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, a television, or another mobile, computation, or communication device.

User device 210 may include a variety of applications, such as, for example, an e-mail application, a telephone application, a camera application, a video application, a multimedia application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

UICC 215 may correspond to a UICC or another type of smart card. UICC 215 may include an integrated circuit and may facilitate the connection of user device 210 to a network, such as a LTE network. UICC 215 may include one or more subscriber identity modules (SIMs). UICC 215 may request data from network devices and perform calculations, based on the requested data, to authenticate user device 210. UICC 215 may receive information relating to secret keys used in the process of decrypting incoming content from NAF device 250.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to BSF device 230 and NAF device 250. Base station 220 may send traffic to and/or receive traffic from user device 210 via an air interface. One or more of base stations 220 may be associated with a radio area network (RAN), such as a LTE network.

BSF device 230 may include one or more network device, or other types of computation or communication devices, that gather, process, and/or provide information in a manner described herein. For example, BSF device 230 may provide application independent functions for mutual authentication of mobile devices (e.g., user device 210) and application devices (e.g., NAF device 250) to each other and for "bootstrapping" the exchange of secret session keys afterwards. The bootstrap procedure may be initiated, for example, during initial power-up of user device 210 or in response to a message from a device (e.g., NAF device 250) instructing user device 210 to begin a bootstrap operation. In some implementations, BSF device 230 and NAF device 250 may be separate devices. In some implementations, BSF device 230 and NAF device 250 may be the same device.

HSS/AAA server 240 may include one or more network devices, or other types of computation or communication devices, that gather, process, search, store, and/or provide information in a manner described herein. For example, HSS/AAA server 240 may manage, authenticate, update, and/or store, in a memory associated with HSS/AAA server 240, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. HSS/AAA server 240 may store information associated with a UICC (e.g., UICC 215). In some implementations, HSS/AAA server 240 may interact with BSF device 230. Additionally, or alternatively, HSS/AAA server 240 may include a device that performs authentication, authorization, and/or accounting (AAA) operations associated with a communication session with user device 210.

NAF device 250 may include one or more network devices, or other types of computation or communication devices, that gather, process, and/or provide information in a manner described herein. For example, NAF device 250 may permit user device 210 to access content (from content provider 270), based on authentication information received from HSS/AAA server 240 and/or BSF device 230. NAF device 250 may interact with BSF device 230, and/or key center 260 to initiate authentication functions of user device 210. Additionally, or alternatively, NAF device 250 may interact with user device 210 to receive authentication information and present authentication information to BSF device 230. NAF device 250 may provide service announcements to user device 210 that include information (e.g., multicast service identifier, time of transmission, description of content, etc.) that may allow user device 210 to receive content and/or services from content provider 270.

Key center 260 may include one or more network devices, or other types of computation or communication devices, that gather, process, and/or provide information in a manner described herein. In some implementations, key center 260 may store secret keys. In some implementations, key center 260 may generate a secret key. In some implementations, key center 260 may generate a secret key and may store the secret key. In some implementation, key center 260 and BSF device 230 may be implemented as separate devices. In some implementations, key center 260 and BSF device 230 may be implemented within in the same device.

Content provider 270 may include one or more network devices, or other types of computation or communication devices that gather, process, and/or provide information in a manner described herein. For example content provider 270 may send, via NAF device 250, content to user device 210.

The content is intended to be broadly interpreted to include any computer readable data that may be transferred over a network. Content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream).

Figure 3:
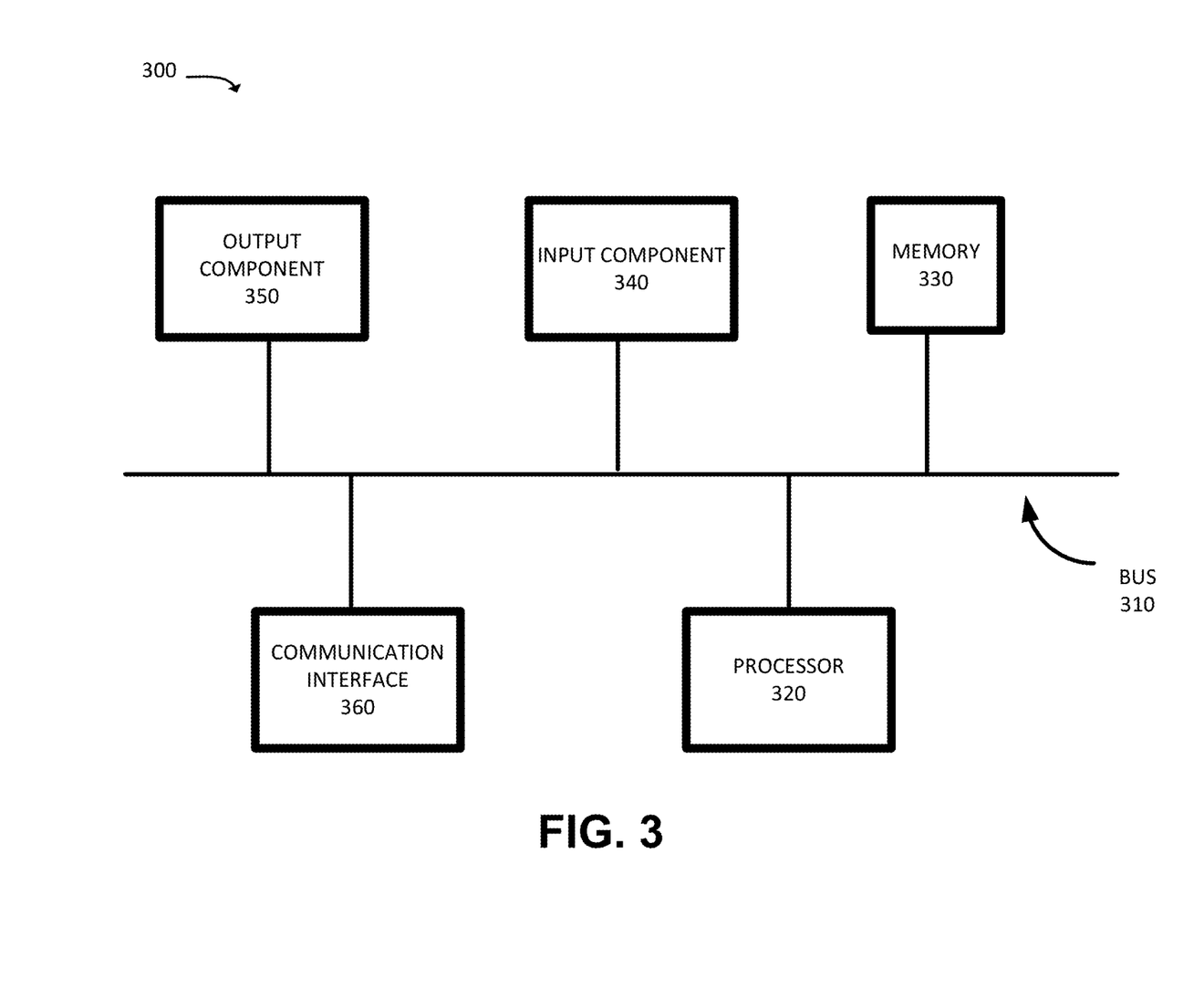
FIG. 3 is a diagram of example components of one or more devices of FIGS. 1 and 2.

FIG. 3 is a diagram of example components of a device 300. Device 300 may correspond to user device 210, UICC 215, base station 220, BSF device 230, HSS/AAA server 240, NAF device 250, key center 260, and content provider 270. Additionally, or alternatively, each of user device 210, UICC 215, base station 220, BSF device 230, HSS/AAA server 240, NAF device 250, key center 260 and/or content provider 270 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interpret and execute instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with a network (described with regard to FIG. 2) and/or devices connected to a network (described with regard to FIG. 2).

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
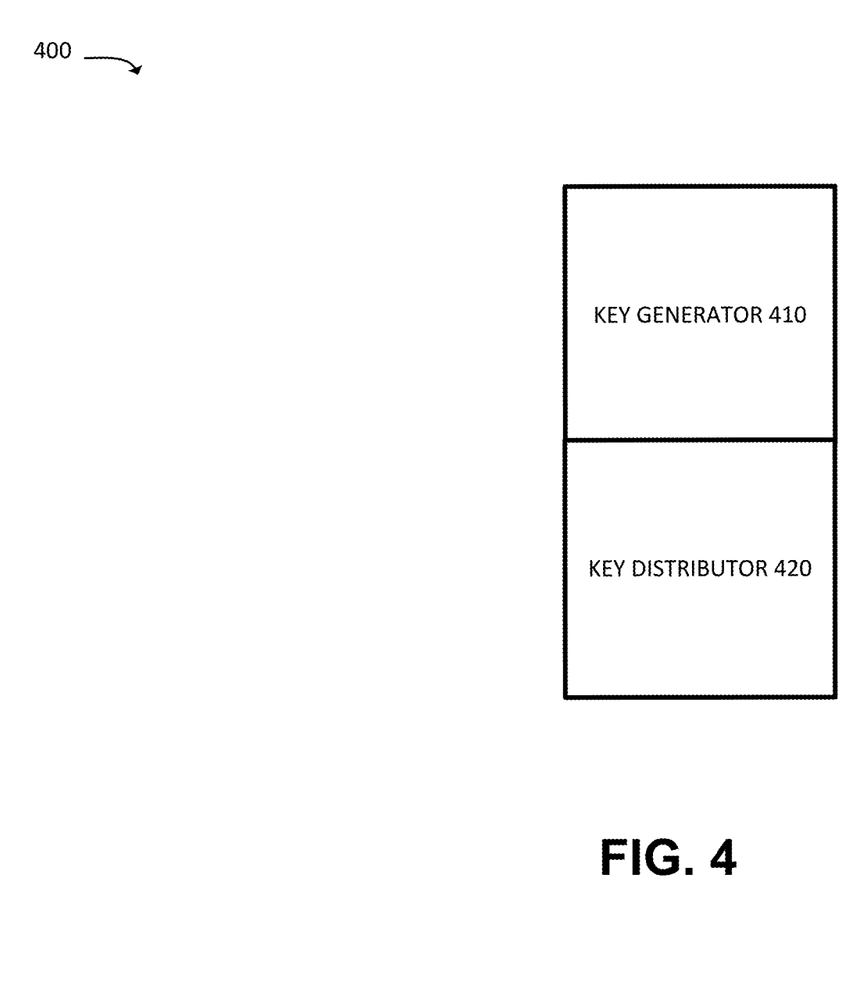
FIG. 4 is a functional block diagram of functional components within an example portion of the environment in FIG. 2.

FIG. 4 is a diagram of example functional components of a device 400 that may correspond to key center 260 or BSF device 230. As illustrated, device 400 may include a key generator 410 and a key distributor 420. Each of functional components 410-420 may be implemented using one or more components of device 300 or by one or more devices 300. One of the functional components in FIG. 4 may perform one or more tasks described as being performed by the other functional component of FIG. 4.

Key center 260 may individually include all of the functional components depicted in FIG. 4, or the functional components depicted in FIG. 4 may be distributed singularly or duplicatively in any manner between the devices illustrated in FIG. 2. In some implementations, key center 260 may include other functional components (not shown) that aid in creating and sending secret keys to other devices.

Key generator 410 may generate one or more different types of secret keys that are used by user device 210 and NAF device 250 to mutually authenticate each other, or generate different types of secret keys to protect (e.g., by encryption) content being sent from a content provider (e.g., content provider 270) to user device 210. Key generator 410 may generate other types of secret keys (e.g., keys for text messaging services) when user device 210 is connected, not connected, to the network. For example, key generator 410 may receive information to generate a secret key for encryption and may send the secret key to user device 210 once user device 210 is connected to the network. Key generator 410 may generate secret keys used for authentication, such as a generic bootstrapping authentication key (hereinafter referred to as "GBA key"). Each type of secret key may be used for a finite amount of time. After the amount of time expires, the secret key may no longer be valid. For example, assume that a GBA key may be used for 24 hours from the time that the GBA key is created. After 24 hours, the GBA key may no longer be valid.

The GBA key may be generated, using a key derivation function, using one or more parameters, such as: a BSF transaction identifier ("hereinafter referred to as "B-TID"), a cipher key (hereinafter referred to as "Ck"), an integrity key (hereinafter referred to as "Ik"), a subscription type, an international mobile subscriber identifier (hereinafter referred to as "IMSI"), GUSS (GBA user security settings), a mobile subscriber integrated services digital network (hereinafter referred to as "MSISDN"), an integrated circuit card identifier (hereinafter referred to as "ICCID"), an application identifier (e.g., an identifier identifying the type of application that requires the GBA key, such as an application providing video content to user device 210), an enterprise name (e.g., an organization, such as a specific entity (such as a bank), that uses the GBA key for authentication of user devices 210 requesting information and/or content), a NAF identifier, a NAF group identifier, an international mobile equipment identity/mobile equipment identifier (hereinafter referred to as "IMEI/MEID"), a service package identifier (e.g., an identifier associated with a particular service, such as service associated with providing medical records), a time stamp (e.g., a time stamp associated with how long the GBA key is valid), and/or a location identifier (e.g., the GBA key is only valid for authenticating user device 210 in a particular geographic location, such as only valid in New York).

The GBA key may have an identifier associating the GBA key to the type of content and/or service that is being protected. For example, if the content is video, the GBA key may have an identifier that indicates that the type of content is video and/or the service being protected is a video service.

Key distributor 420 may send a secret key, generated by key generator 410, to other network devices (e.g., NAF 250, BSF device 230) and/or user device 210. In some implementations, key distributor 420 may use the multimedia Internet KEYing protocol (hereinafter referred to as "MIKEY protocol") to send a secret key (such as GBA key) to user device 210, NAF device 250, and/or any other network device. In some implementations, key distributor 420 may use other communication protocols (e.g., Internet Protocol ("IP"), or hyper text transfer protocol ("HTTP")) to send generated secret keys.

Figure 5:
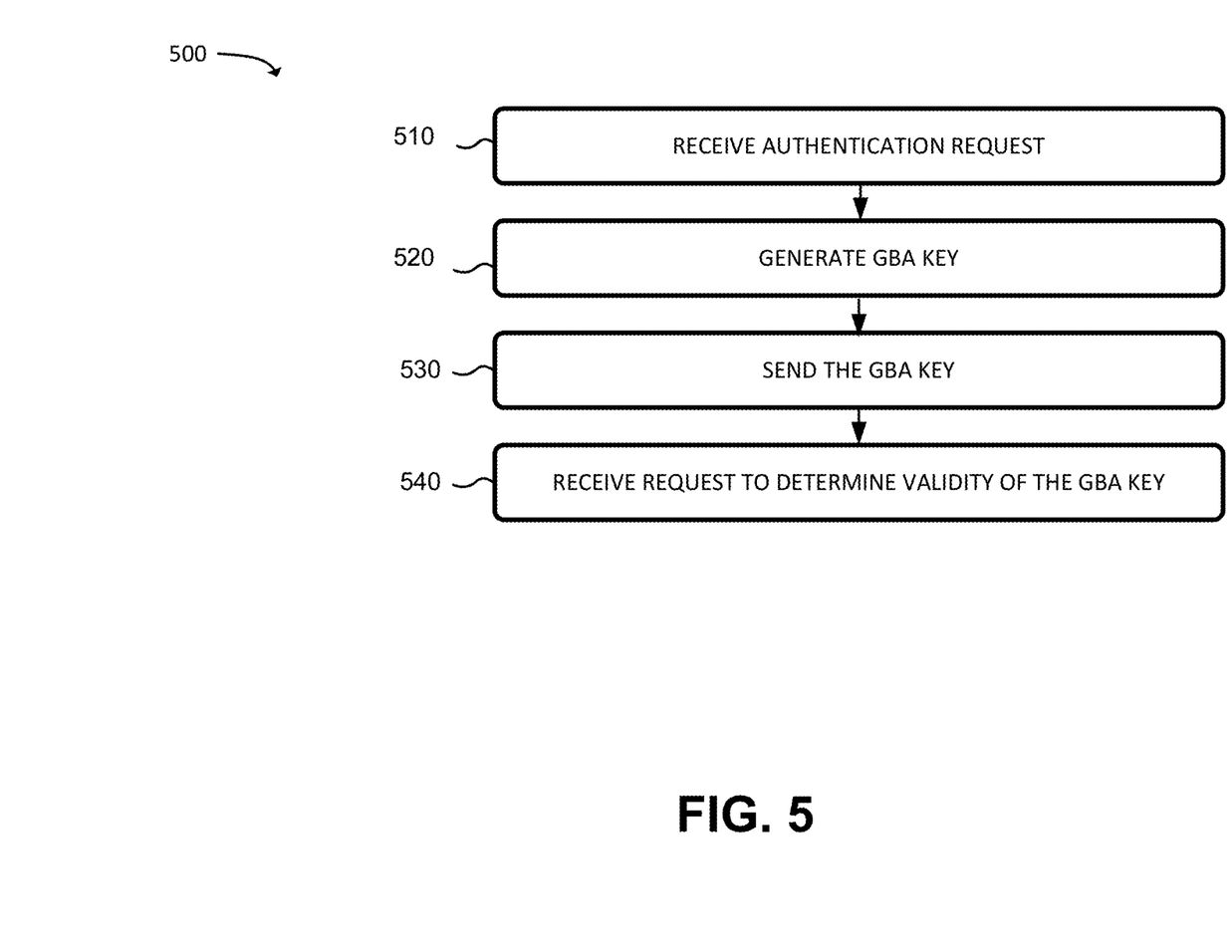
FIG. 5 is a flow chart of an example process for generating and storing a secret key.

FIG. 5 is a flow chart of an example process of generating and sending a secret key. In one example implementation, process 500 may be performed by key center 260. In another example implementation, one or more blocks of process 500 may be performed by one or more other devices, such as BSF device 230 or NAF device 250.

Process 500 may include receiving an authentication request (block 510). BSF device 230 may receive an authentication request based on user device 210 requesting content from content provider 270 via NAF device 250. NAF device 250 may send a message to user device 210 that user device 210 is to be authenticated before content may be sent to user device 210.

User device 210 may send the authentication request to BSF device 230 so that user device 210 may be validated to receive content from content provider 270. BSF device 230 may send a message to key center 260, to determine whether user device 210 may have already been authenticated and key center 260 may stored a valid GBA key from a previous GBA authentication procedure. If key center 260 determines that there is a valid GBA key for user device 210, key center 260 may send the GBA key to BSF device 230. BSF device 230 may send the GBA key to user device 210 and/or NAF device 250. If key center 260 determines that there is no valid GBA key for user device 210, key center 260 may send a message to BSF device 230 that user device 210 does not have a valid GBA key.

BSF device 230 may use the GBA authentication procedure to authenticate user device 210. In the GBA authentication procedure, BSF 230 may send a message to HSS/AAA server 240. The message may include a request to determine whether user device 210 is permitted to use a LTE network and/or whether user device 210 is permitted to access content from content provider 270.

HSS/AAA server 240 may receive the message. HSS/AAA server 240 may determine that user device 210 is an authorized user device. HSS/AAA server 240 may authenticate user device 210, by determining that user device 210 is authorized to use the LTE network. HSS/AAA server 240 may send a message to BSF device 230 that user device 210 is authenticated. BSF device 230 may send a message to key center 260 that user device 210 is authenticated.

Additionally, or alternatively, the message from BSF device 230 may include a request to determine whether the user account for accessing content from content provider 270 is valid. HSS/AAA server 240 may determine that the user account is valid, by accessing profile information (stored in HSS/AAA server 240) associated with user device 210 that identifies that the user account is valid, and send a message to BSF device 230 that the user account is valid. BSF device 230 may send a message to key center 260 that user device 210 is authenticated.

BSF device 230 may send a message to user device 210 that user device 210 is authenticated. User device 210 may receive the message.

With user device 210 authenticated, key center 260 may create a B-TID. The B-TID is an identifier used to define the session during which user device 210 is validated by the network. Key center 260 may store the B-TID. Key center 260 may send the B-TID to BSF device 230 and user device 210. The B-TID may be valid for a limited amount of time. For example, the B-TID may be valid for a 24 hour interval of time. Alternatively, the B-TID may be valid as long as a session is valid, or the B-TID may be valid for a time period greater than the time associated with a session. Additionally, or alternatively, the B-TID may be valid for a particular coverage area, and/or for a particular session. During this interval of time, user device 210 may receive content from content provider 270 via NAF device 250. In one example implementation, once the B-TID expires, key center 260 may notify NAF device 250 that the B-TID is expired. NAF device 250 may notify user device 210 that the B-TID is expired. In another example implementation, key center 260 may notify BSF device 230. BSF device 230 may notify NAF device 210 and user device 210 that the B-TID is expired. User device

210 may request a new B-TID (based on receiving a message from NAF device 250 that user device 210 is using an expired B-TID to request content) from key center 260 and go through the GBA authentication procedure to create the new B-TID.

Additionally, or alternatively, key center 260 may generate a Ck and an Ik. The Ck is associated with protecting and providing signal data integrity between new devices. The Ik is associated with providing authentication of a device (e.g., user device 210 or NAF device 250) sending or requesting information. In one example implementation, the Ck and the Ik may be stored in key center 260. In another example implementation, the Ck and the Ik may be stored in key center 260 and sent to UICC 215 in user device 210. UICC 215 may use a key derivation function (in UICC 215) to generate a GBA key by using the Ck and the Ik. The Ck and the Ik are associated with a session (e.g., a LTE session). Once the session expires, the Ck and the Ik are no longer valid. The session may expire based on a user turning off user device 210, user device 210 being powered down, user device 210 moving to a different coverage area, or user device 210 attempting to use different network technology. In one example implementation, key center 260 may send a message to BSF device 230 that the session is expired. BSF device 230 may notify NAF device 250 and user device 210 that the session is expired. In another example implementation, key center 260 may send a message to BSF device 230 and NAF device 250 that the session is expired. BSF device 230 or NAF device 250 may notify user device 210 that the session is expired.

Process 500 may include generating a GBA key (block 520). For example, key center 260 may generate a GBA key using the parameters (e.g., the Ck and the Ik), described with regard to FIG. 4. Key center 260 may store the GBA key. The GBA key may expire after a period of time (e.g., the GBA key is valid for 24 hours or in response to an event (e.g., a specific sporting event being viewed on user device 210 may end)). Once the time expires, key center 260 may remove the GBA key from storage. The GBA key, being used by user device 210, may expire and user device 210 may request authentication (based on receiving a message from NAF device 250 that user device 210 is using an expired GBA key to request content) from key center 260 to receive a new GBA key. Additionally, or alternatively, the GBA key may be assigned for a specified coverage area of a network. For example, the GBA key may be used only in the New York metropolitan area.

Process 500 may include sending the GBA key (block 530). In one example implementation, key center 260 may send the GBA key to user device 210 (or UICC 215 in user device 210), BSF device 230, and/or NAF device 250, using key distributor 420 described with regard to FIG. 4. In another example implementation, key center 260 may send the GBA key to BSF device 230 using key distributor 420, described with regard to FIG. 4. BSF device 230 may send the GBA key to user device 210 and NAF device 250. User device 210 (or UICC 215 in user device 210) may authenticate NAF device 250 by using the GBA key. NAF device 250 may authenticate user device 210 (or UICC 215 in user device 210) by using the same GBA key.

Process 500 may include receiving a request to determine validity of the GBA key (block 540). Key center 260 may receive a message from another network device (e.g., BSF device 230) to determine validity of the GBA key.

For example, user device 210 may have received a GBA key (associated with a B-TID) that only allows content from content provider 270 to be sent (via NAF device 250) to user device 210 in only one coverage area of the network (e.g., football content that can only be seen in New York). If user device 210 moves into another coverage area of the network (e.g., Chicago), then user device 210 may not receive the content in the new coverage area. Another NAF device 250 (that provides service to the new coverage area) may receive a request from user device 210 for content. The other NAF device 250 may determine that user device 210 is attempting to use a GBA key in the new coverage area of the network.

In one example implementation, the other NAF device 250 may send a message to BSF device 230 requesting whether user device 210 may use the GBA key in the new coverage area. BSF device 230 may receive the request and send a request to key center 260 to determine the validity of the GBA key. In another example implementation, the other NAF device 250 may send a message, requesting the validity of the GBA key, to key center 260.

Alternatively, UICC 215 in user device 210 may be removed from user device 210 and inserted into another user device 210. A communication between the other user device 210 and NAF device 250 may indicate to NAF device 250 that UICC 215 is in the other user device 210. NAF device 250 may determine that UICC 215 is in the other user device 210 based on NAF device 250 detecting an IMEI or MEID identifier associated with the other user device 210. In one example implementation, NAF device 250 may send a message to BSF device 230 requesting whether the GBA key may be sent to the other user device 210. BSF device 230 may send a message to key center 260. In another example implementation, NAF device 250 may send a message to key center 260.

Key center 260 may receive the message to determine whether the GBA key is still valid. Key center 260 may determine (based on the parameters, described with regard to FIG. 4, used to generate of the GBA key) that the GBA key may not be used (e.g., the GBA key may not be used in a different coverage area, or the GBA key may not be sent to UICC 215 when inserted in the other user device, etc.). Key center 260 may send a message to BSF device 230 that the GBA key is not valid. BSF device 230 may send a message to NAF device 250 (or the other NAF device 250) that the GBA key is not valid. NAF device 250 (or the other NAF device 250) may receive the message from BSF device 230. NAF device 250 (or the other NAF device 250) may send a message to user device 210 that user device 210 may not receive content from content provider 270.

Figure 6:
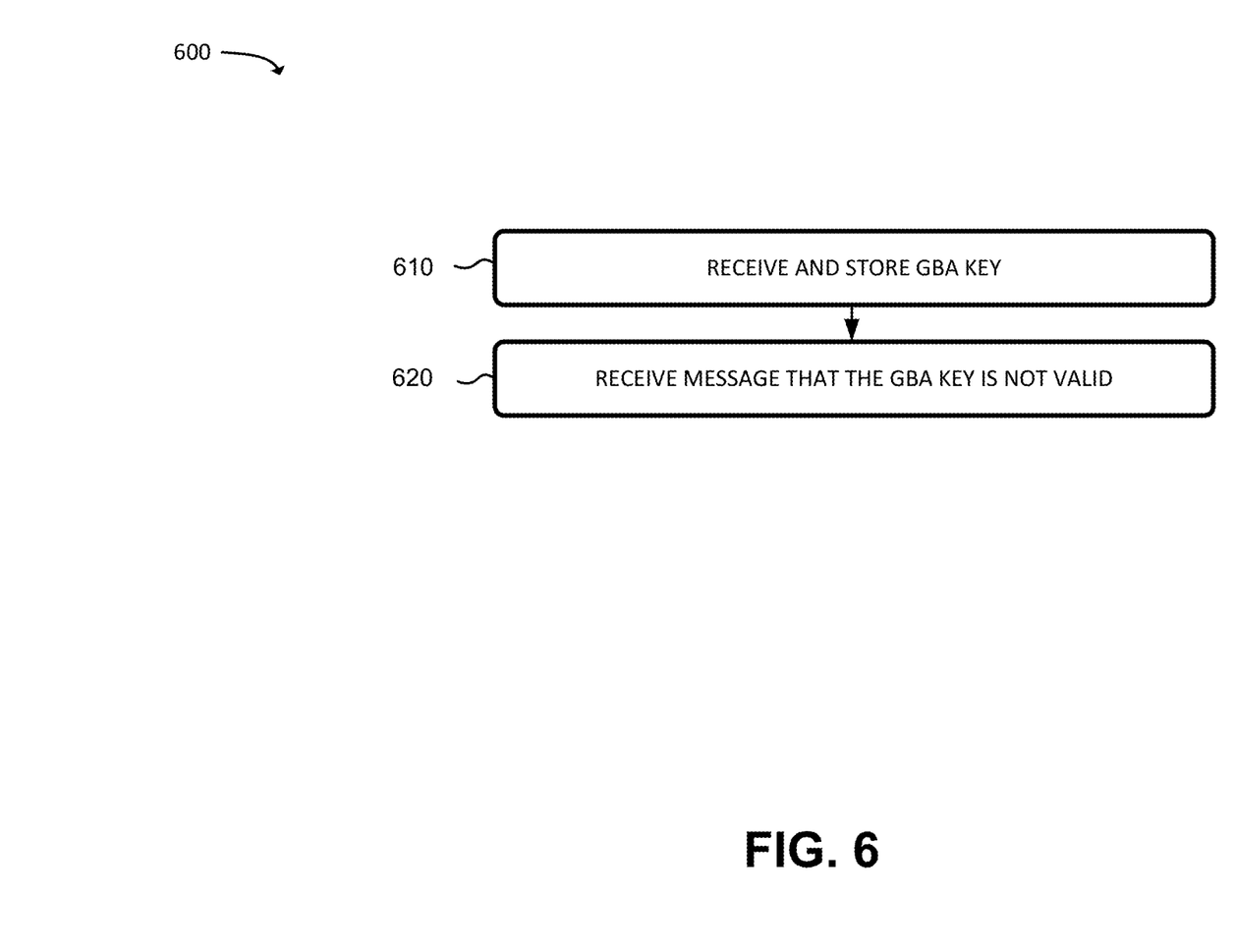
FIG. 6 is a flow chart of an example process for receiving and storing a secret key.

FIG. 6 is a flow chart of an example process of receiving and storing a secret key. In one example implementation, process 600 may be performed by key center 260. In another example implementation, one or more blocks of process 600 may be performed by one or more other devices, such as BSF device 230 or NAF device 250.

Process 600 may include receiving and storing a GBA key (block 610). For example, key center 260 may receive a GBA key from BSF device 230. BSF device 230 may generate a GBA key in the manner described with regard to block 510 in FIG. 5. Key center 260 may store the GBA key. Additionally, BSF device 230 may generate the Ck and the Ik, and BSF device 230 may send the Ck and the Ik to key center 260. Key center 260 may store the Ck and the Ik. Additionally, BSF device 230 may generate the B-TID, associated with the GBA key, and may send the B-TID to key center 260.

Process 600 may include receiving a message that the GBA key is not valid (block 620). For example, BSF device 230 may receive a request, from NAF device 250, to determine whether the GBA key may be used, described with regard to block 540 in FIG. 5. Alternatively, BSF device 230 may receive a request, from NAF device 250, to determine whether the GBA key may be used in another user device 210

(with a different ICCID) that is using UICC 215 that was removed from user device 210 and inserted into the other user device 210 (described with regard to block 540 in FIG. 5).

BSF device 230 may determine that the GBA key may not be used, as described with regard to block 540 in FIG. 5. BSF device 230 may send a message to key center 260 that the GBA key is not valid. Key center 260 may receive the message and may delete the GBA key from its memory. BSF device 230 may also send a message to NAF device 250 that the GBA key is not valid. NAF device 250 may receive the message from BSF device 230. NAF device 250 may send a message to user device 210 (or the other user device 210) that user device 210 (or the other user device 210) may not receive content from content provider 270. User device 210 (or the other user device 210) may request a new GBA key by initiating a new request for authentication.

Figure 7:
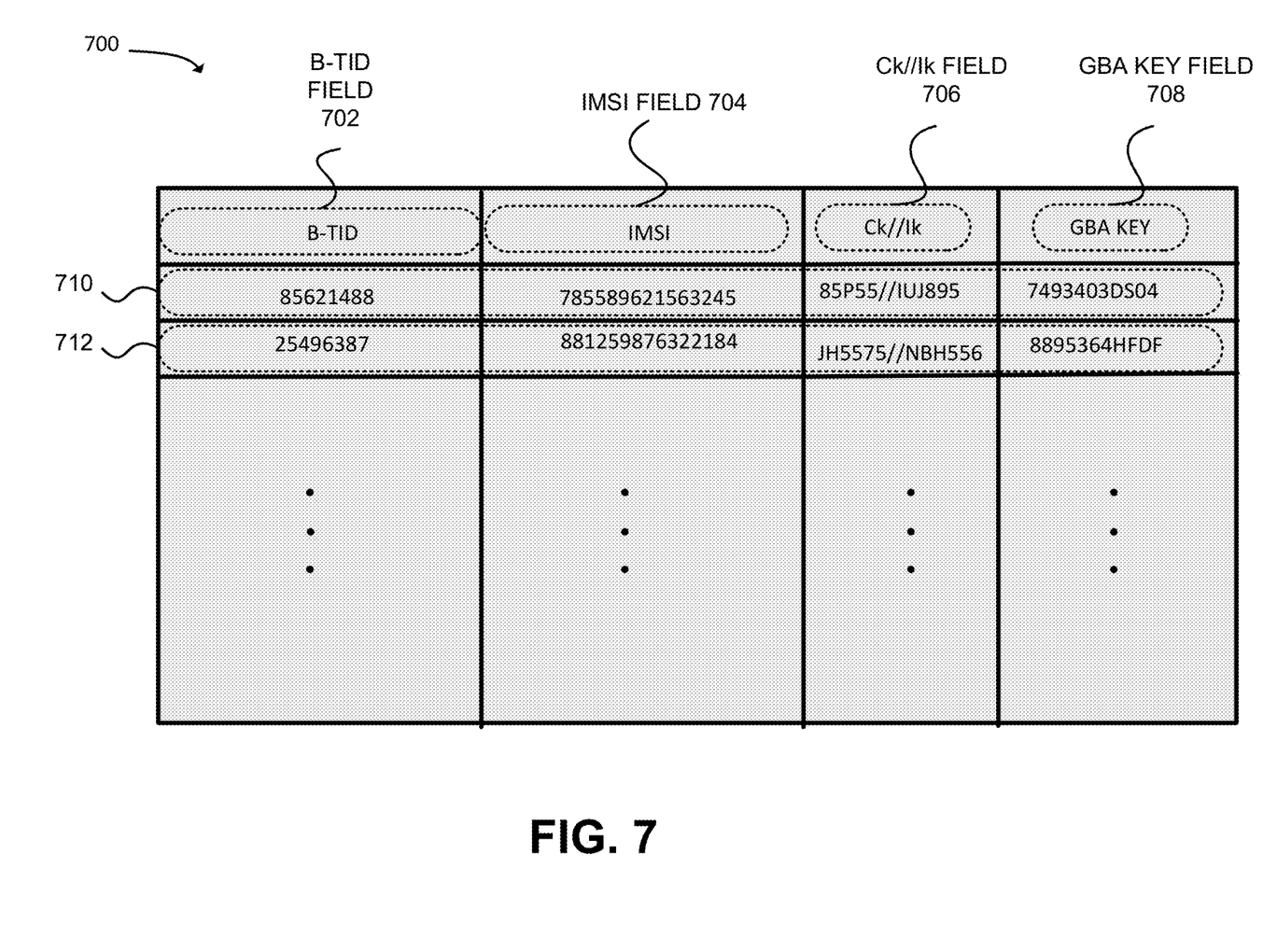
FIG. 7 is a diagram of an example data structure that stores secret keys.

FIG. 7 is a diagram of an example data structure 700 that stores secret keys and information relating to secret keys. In one example implementation, key center 260 may store some or all of data structure 700. Additionally, or alternatively, BSF device 230 may store some or all of data structure 700. Additionally, or alternatively, data structure 700 may be stored in memory, associated with another device or group of devices, separate from or in combination with the memory associated with key center 260, and/or BSF device 230.

Data structure 700 may include a collection of fields, such as a B-TID field 702, IMSI field 704, Ck//Ik field 706, and GBA key field 708. Although FIG. 7 shows example fields 702-708, in other implementations, data structure 700 may include fewer fields, different fields, additional fields, and/or differently arranged fields than depicted in FIG. 7. Additionally, or alternatively, one or more fields of data structure 700 may include information described as being included in one or more fields of data structure 700.

B-TID field 702 may store a B-TID. The B-TID may be an identifier for the bootstrapping session between user device 210 and one or more network devices (e.g., BSF device 230, NAF device 250, and/or key center 260). The B-TID may be associated with a type of application and/or content being requested by user device 210 (via NAF device 250) from content provider 270. B-TID field 702 may also store any time restrictions associated with the B-TID. For example, the B-TID may only be valid for a particular amount of time, in a particular coverage area, and/or for a particular session.

IMSI field 704 may store an identifier associated with a particular user device (e.g., user device 210). The IMSI may be an identifier for a particular user device 210 that may be using a GBA key. The IMSI may be associated with subscription information. The subscription information may include information relating to services that are subscribed to by a user of user device 210 (e.g., phone services, applications, etc.)

Ck//Ik field 706 may store the Ck and the Ik. The Ck and the Ik may be associated with a session (e.g., a LTE session). In one example implementation, the Ck and the Ik are generated by key center 260, described with regard to FIG. 5. In another example implementation, the Ck and the Ik are generated by BSF device 230, described with regard to FIG. 6.

GBA key field 708 may store a GBA key. In one example implementation, BSF device 230 may send a GBA key to key center 260, described with regard to block 610 in FIG. 6. In another example implementation, key center 250 may generate the GBA key, described with regard to block 520 in FIG. 5.

In an example implementation, key center 260 may store a GBA key, 749340DS04, described in ellipse 710. The GBA key may be associated with a particular user device 210 that has an IMSI identifier (785589621563245, in ellipse 710). The GBA key may be associated with a B-TID (85621488 in ellipse 710). The B-TID may be associated with a particular service. For example, the B-TID may be associated with providing content associated with multi-broadcast multicast services (MBMS). Key center 260 may store another GBA key, 8895364HFDF, described in ellipse 712 that may be associated with another B-TID. The other B-TID may be associated, for example, with providing encrypted content for a bank that uses a GBA key to authenticate user device 210 being used by a user to obtain financial information from the bank.

Key center 260 may store these identifiers until one or more of the identifiers expires (described with regard to block 520 in FIG. 5), based on key center 260 determining that one or more of the identifiers is not valid (described with regard to block 540 in FIG. 5), or until key center 260 receives a message (e.g., from BSF device 230) that one or more of the identifiers is not valid (described with regard to block 620 in FIG. 6). Key center 260 may remove the entry for a GBA key that is no longer valid. For example, a GBA key may become invalid because the GBA key is being used in a different geographic region. Or, alternatively, a GBA key may become invalid because the B-TID is only valid for 24 hours and user device 210 is attempting to request information or content (from NAF device 250) beyond the 24 hour time limit. Key center 260 may send a message to BSF device 230 and/or NAF device 250 that the GBA key is no longer valid.

Figure 8A:
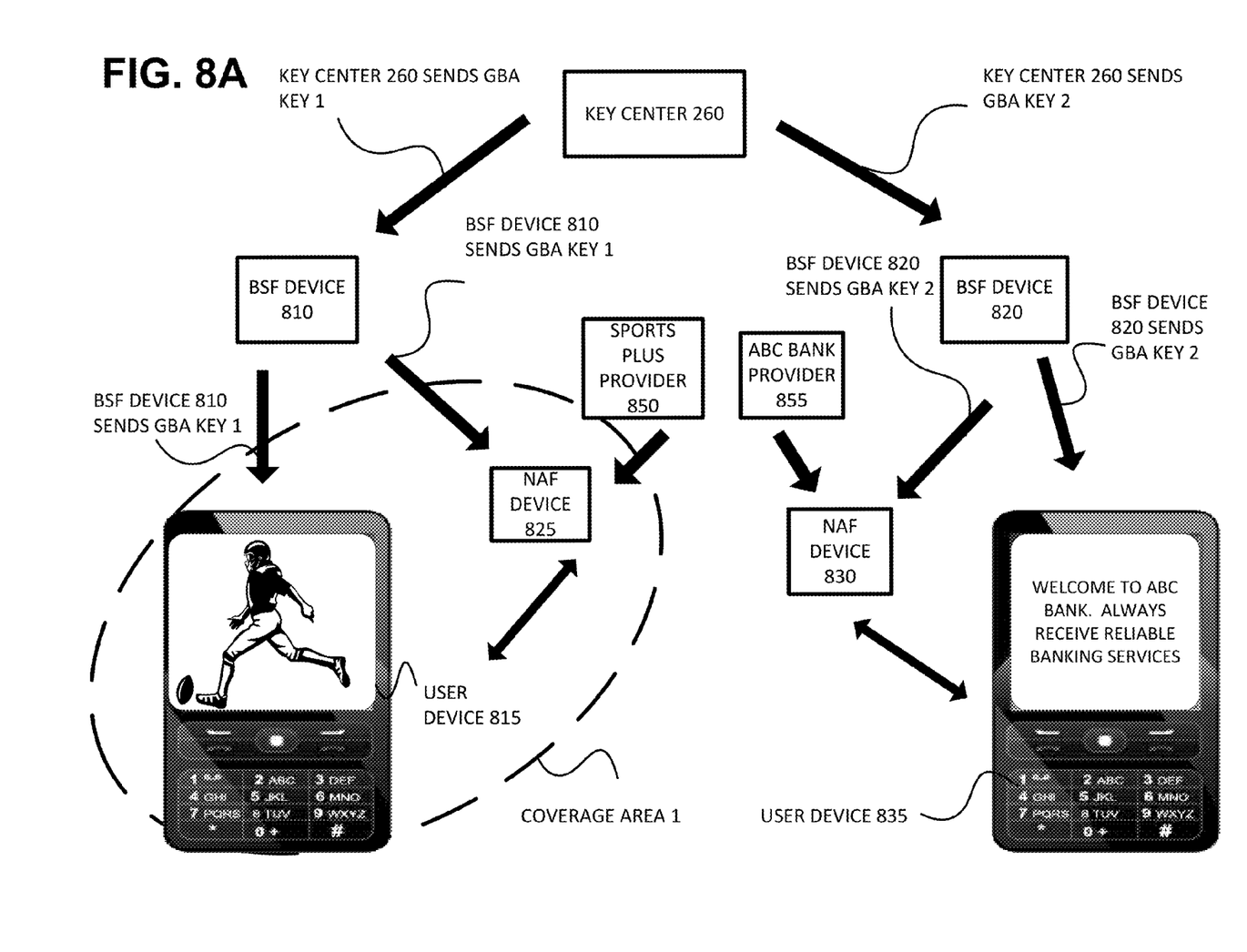
FIGS. 8A-8B are diagrams of example processes for generating and using a secret key.
Figure 8B:
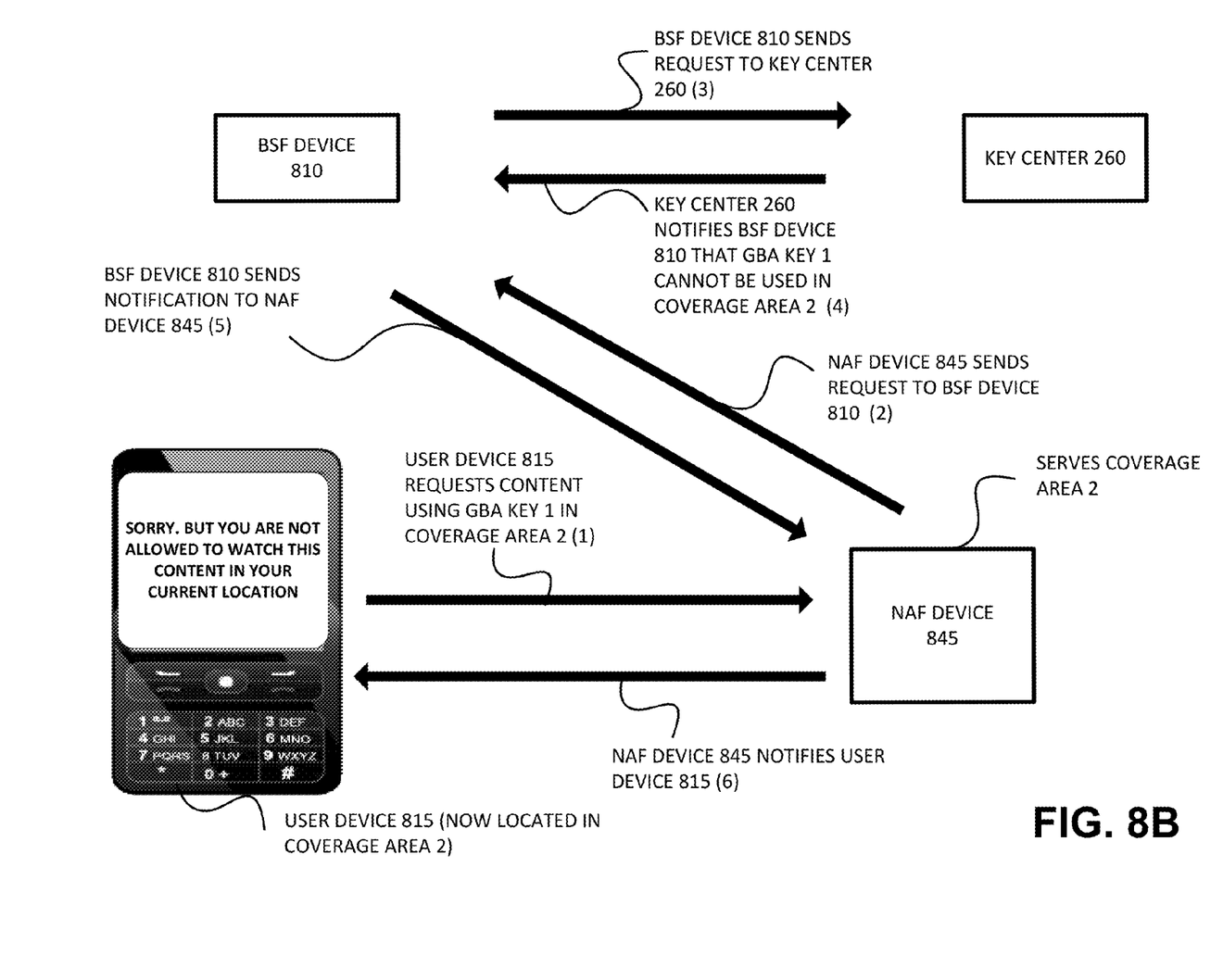

FIGS. 8A-8B are example processes for generating and using a secret key. FIGS. 8A-8B show key center 260, BSF device 810, user device 815, BSF device 820, NAF device 825, NAF device 830, user device 835, NAF device 845, Sports Plus provider 850, and ABC Bank provider 855. User device 815 and user device 835 may each correspond to user device 210, described with regard to FIG. 2. BSF device 810 and BSF device 820 may each correspond to BSF device 230, described with regard to FIG. 2. NAF device 825, NAF device 830, and NAF device 845 may each correspond to NAF device 250, described with regard to FIG. 2. Sports Plus provider 850 and ABC Bank provider 855 may each correspond to content provider 270, described with regard to FIG. 2.

As shown in FIG. 8A, key center 260 may generate GBA key 1 and GBA key 2. Key center 260 may store GBA key 1 and GBA key 2. GBA key 1 and GBA key 2 are secret keys used to authenticate user device 815 and user device 835, respectively, when user device 815 receives content from NAF device 825 and when user device 835 receives content from NAF device 830.

It is assumed that key center 260 generated GBA key 1 as a result of successfully authenticating user device 815 based on a request to receive content from NAF device 825. A user, of user device 815, may be seeking to receive football game content from a content provider, "Sports Plus." Sports Plus may send content from Sports Plus provider 850 to user device 815, via NAF device 825. As shown in FIG. 8A, user device 815, and NAF device 825, may be in coverage area 1 of the network. The content provider may send the football game content through NAF device 825. NAF device 825 may require user device 815 to be authenticated before football game content is sent to user device 815. Key center 260 may send GBA key 1 to BSF device 810. BSF device 810 may receive GBA key 1. BSF device 810 may determine to send GBA key 1 to NAF device 825. BSF device 810 may send GBA key 1 to user device 815. User device 815 may receive GBA key 1 and may store GBA key 1 in a UICC (e.g., UICC 215) that is attached to user device 815.

It is further assumed that key center 260 generated GBA key 2 as a result of successfully authenticating user device 835 based on a request to receive content from NAF device 830. A user, of user device 835, may be seeking to view financial information from a bank, "ABC Bank." ABC Bank may send the financial information from ABC Bank provider 855 to user device 835, via NAF device 830. NAF device 830 may require user device 835 to be authenticated before financial information is sent to user device 835. Key center 260 may send GBA key 2 to BSF device 820. BSF device 820 may receive GBA key 2. BSF device 820 may determine to send GBA key 2 to NAF device 830. BSF device 820 may send GBA key 2 to user device 835. User device 835 may receive GBA key 2 and may store GBA key 2 in a UICC (e.g., UICC 215) that is attached to user device 835.

User device 815 and NAF device 825 may use GBA key 1 to mutually authenticate each other during the process of content being sent from NAF device 825 to user device 815. Similarly, user device 835 and NAF device 830 may use GBA key 2 to mutually authenticate each other during the process of content being sent from NAF device 830 to user device 835.

As shown in FIG. 8B, user device 815 is now located in coverage area 2. The user, of user device 815, may still want to watch the football content on user device 815. User device 815 may send GBA key 1 to authenticate user device 815 with NAF device 845 (identified by (1) in FIG. 8B). NAF device 845 may be used to provide football content from Sports Plus in coverage area 2 of the network.

NAF device 845 may receive GBA key 1 and may determine that user device 815 received the GBA key from NAF device 825. NAF device 845 may send a request to BSF device 810, requesting BSF device 810 to determine whether GBA key 1 can be used in coverage area 2 to authenticate user device 815 (identified by (2) in FIG. 8B). BSF device 810 may receive GBA key 1 and may determine that key center 260 is to determine whether GBA key 1 can be used in coverage area 2. BSF device 810 may send GBA key 1 to key center 260 (identified by (3) in FIG. 8B). Key center 260 may receive GBA key 1. Key center 260 may analyze GBA key 1 and determine that GBA key 1 is only valid in coverage area 1 of the network and cannot be used in coverage area 2 of the network. Key center 260 may send a message to BSF device 810 that GBA key 1 cannot be used in coverage area 2 (identified by (4) in FIG. 8B). BSF device 810 may receive the message from key center 260. BSF device 810 may send a message to NAF device 845 that GBA key 1 cannot be used in coverage area 2 (identified by (5) in FIG. 8B). NAF device 845 may receive the message from BSF device 810. NAF device 845 may notify user device 815 that GBA key 1 cannot be used in coverage area 2. User device 815 may receive the message (identified by (6) in FIG. 8B). User device 815 may, as shown in FIG. 8B, provide a message to the user, of user device 815, that the content cannot be watched at the current location.

Systems and/or methods described herein may generate and store multiple secret keys that are used to authenticate user devices, within a network, that are associated with multiple applications, services, and/or organizations. As a result, multiple secret keys that are used for different applications and services may be stored in a central network device.

The foregoing description of implementations provides illustration and description, but is not intended to be exhaustive or to limit the implementations to the precise form disclosed. Modifications and variations are possible in light of the above disclosure or may be acquired from practice of the implementations.

While series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    receiving, by a first network device, a first request for a first secret key and a second request for a second secret key,
        the first secret key being used to authenticate a first user device,
        the second secret key being used to authenticate a second user device,
        the first user device requesting to receive first content associated with a first type of service, and
        the second user device requesting to receive second content from a second type of service;
    generating, by the first network device, the first secret key based on receiving the first request;
    generating, by the first network device, the second secret key based on receiving the second request;
    sending, by the first network device, the first secret key to the first user device and to a second network device,
        the second network device using the first secret key to authenticate the first user device, and
        the first user device using the first secret key to authenticate the second network device for the first user device to receive the first content; and
    sending, by the first network device, the second secret key to the second user device and to a third network device,
        the third network device using the second secret key to authenticate the second user device, and the second user device using the second secret key to authenticate the third network device for the second user device to receive the second content.

2. The method of claim 1,
where sending the first secret key to the first user device and the second network device allows the first user device to receive the first content from the second network device, and
where sending the second secret key to the second user device and the third network device allows the second user device to receive the second content from the third network device.

3. The method of claim 1, where generating the first secret key includes:
generating the first secret key based on a generic bootstrapping user security setting, a subscription type, a cipher key, and an integrity key.

4. The method of claim 1, where generating the second secret key includes:
generating the second secret key based on an international mobile subscriber identity, associated with the second user device, and a coverage area of a network associated with the second user device and the third network device.

5. The method of claim 1,
where sending the first secret key to the first user device includes:
sending the first secret key to a universal integrated circuit card located in the first user device; and
where sending the second secret key to the second user device include:
sending the second secret key to another universal integrated circuit card located in the second user device.

6. The method of claim 1,
where the first secret key is associated with a first identifier associating the first secret key with a type of content,
where the second secret key is associated with a second identifier associating the second secret key with another type of content, and
where the method further comprises:
storing the first identifier associated with the first secret key; and
storing the second identifier associated with the second secret key.

7. The method of claim 1, further comprising:
receiving a message that indicates that a first universal integrated circuit card is removed from the first user device and that the first universal integrated circuit card is inserted into a third user device;
determining that the third user device cannot use the first secret key based on the universal integrated circuit card being inserted in the third user device; and
sending a notification to the second network device that the third user device cannot be authenticated by using the first secret key.

8. A device comprising:
a memory to store instructions; and
a processor to execute the instructions to:
receive a first request for a first secret key;
receive a second request for a second secret key,
the first secret key being used to authenticate a first user device,
the second secret key being used to authenticate a second user device,
the first secret key being associated with a first type of content,
the second secret key being associated with a second type of content, and
the first type of content being different than the second type of content;
generate the first secret key based on receiving the first request;
generate the second secret key based on receiving the second request;
send the first secret key to the first user device and a first network device,
the first network device using the first secret key to authenticate the first user device; and
send the second secret key to the second user device and a second network device,
the second network device using the second secret key to authenticate the second user device.

9. The device of claim 8,
where the first secret key is associated with a coverage area of a network, associated with the first network device, and
where the first secret key cannot be used outside the coverage area.

10. The device of claim 8, where the processor is further to:
receive a message from a third network device,
the message including a request to determine whether the first secret key can be used by the third network device to authenticate the first user device;
determine that the first secret key can be used by the third network device to authenticate the first user device; and
send a notification to the third network device that the first secret key can be used by the third network device to authenticate the first user device.

11. The device of claim 8,
where the first secret key is associated with an international mobile subscriber identifier that is associated with the first user device, and
where the first secret key is associated with an integrated circuit card identifier that is associated with a universal integrated circuit card inserted in the first user device.

12. The device of claim 8,
where the first type of content is associated with a multi-broadcast multicast service, and
where the second type of content is not associated with a multi-broadcast multicast service.

13. The device of claim 8, where, when generating the first secret key, the processor is to:
generate the first secret key using a generic bootstrapping architecture authentication procedure.

14. The device of claim 8, where the processor is further to:
receive a third request for a third secret key,
the third secret key being used by a third network device to encrypt content and
the third secret key being used by a third user device to decrypt the encrypted content received from the third network device;
generate the third secret key based on receiving the third request; and
send the third secret key to the third user device and the third network device.

15. The device of claim 14, where, when generating the third secret key, the processor is to:
generate the third secret key by using a procedure that is different than a generic bootstrapping authentication procedure.

16. A method comprising:
receiving, by a first network device, a first request for a first secret key and a second request for a second secret key, the first secret key being used to authenticate a first user device, and the second secret key being used to authenticate a second user device;

generating, by the first network device, the first secret key based on receiving the first request;

generating, by the first network device, the second secret key based on receiving the second request, the first secret key and the second secret key being generated based on a generic bootstrapping architecture authentication procedure;

sending, by the first network device, the first secret key to the first user device and a second network device, the second network device using the first secret key to authenticate the first user device, and the first user device using the first secret key to authenticate the second network device for the first user device to receive a first type of content; and sending, by the first network device, the second secret key to the second user device and a third network device, the third network device using the second secret device to authenticate the second user device, and the second user device using the second secret key to authenticate the third network device for the second user device to receive a second type of content that is different than the first type of content.

17. The method of claim 16, further comprising:
authenticating that the first user device is allowed to receive first content from the second network device by determining that the first user device is subscribed to receive the first content; and
authenticating that the second user device is allowed to receive second content from the third network device by determining that the second user device is subscribed to receive the second content.

18. The method of claim 17, where authenticating that the first user device is allowed to receive the content includes:
authenticating that the first user device is authorized to use a network associated with the first network device and the second network device.

19. The method of claim 16, where the first secret key and the second secret key are valid for a finite amount of time and valid in a specific coverage area of a network.

20. The method of claim 16, further comprising:
receiving a message from a fourth network device,
the message including a request to determine whether the first secret key can be used by the fourth network device, in a first coverage area of the network, to authenticate the first user device;
determining that the first secret key can be used by the fourth network device to authenticate the first user device; and
sending a notification to the fourth network device that the first secret key can be used by the third network device to authenticate the first user device.

* * * * *